(12) United States Patent
Casalini et al.

(10) Patent No.: US 7,906,576 B2
(45) Date of Patent: Mar. 15, 2011

(54) RUBBER-REINFORCED VINYL AROMATIC POLYMERS

(75) Inventors: Alessandro Casalini, Mantova (IT); Luca Monti, Mantova (IT); Anna Grazia Rossi, Mantova (IT)

(73) Assignee: Polimeri Europa S.p.A., Brindisi (IT)

( * ) Notice: Subject to any disclaimer, the term of this patent is extended or adjusted under 35 U.S.C. 154(b) by 475 days.

(21) Appl. No.: 10/561,266

(22) PCT Filed: Jul. 2, 2004

(86) PCT No.: PCT/EP2004/007296
§ 371 (c)(1),
(2), (4) Date: Nov. 17, 2006

(87) PCT Pub. No.: WO2005/005539
PCT Pub. Date: Jan. 20, 2005

(65) Prior Publication Data
US 2007/0149686 A1    Jun. 28, 2007

(30) Foreign Application Priority Data

Jul. 11, 2003   (IT) .............................. MI2003A1420

(51) Int. Cl.
*C08F 283/00* (2006.01)
*C08L 51/04* (2006.01)
*C08L 53/02* (2006.01)
*C08L 55/04* (2006.01)

(52) U.S. Cl. ............ 524/457; 526/201; 525/70; 525/71; 525/86

(58) Field of Classification Search .................... 525/70, 525/71, 86, 193, 241, 316, 313–315
See application file for complete search history.

(56) References Cited

U.S. PATENT DOCUMENTS

| 4,493,922 A | | 1/1985 | Echte et al. |
| 4,785,051 A | * | 11/1988 | Henton ........................... 525/71 |
| 5,039,714 A | * | 8/1991 | Kasahara et al. ............. 521/148 |
| 5,179,166 A | * | 1/1993 | Demirors ....................... 525/193 |
| 5,294,656 A | * | 3/1994 | Okamoto et al. ............. 524/269 |

(Continued)

FOREIGN PATENT DOCUMENTS

EP    0 418 042    3/1991

(Continued)

OTHER PUBLICATIONS

Barton et al. "CRC Handbook of Solubility Parameters and Other Cohesion Parameters". p. 406. Ed. 2, 1991. Obtained from www.books.google.com.*

(Continued)

*Primary Examiner* — Mark Eashoo
*Assistant Examiner* — Michael A Salvitti
(74) *Attorney, Agent, or Firm* — Oblon, Spivak, McClelland, Maier & Neustadt, L.L.P.

(57) ABSTRACT

Rubber-reinforced vinyl aromatic polymers having a strictly bimodal morphology, comprising from 55 to 90% by weight of a rigid polymeric matrix and from 10 to 45% by weight of a rubbery phase dispersed inside said rigid polymeric matrix, in the form of grafted and occluded particles and wherein said rubber particles consist of from 60 to 99% by weight of particles with a capsule or "core-shell" morphology and from 1 to 40% by weight of particles with a "salami" morphology, said percentages being measured on the basis of the weight of the rubber particles only.

21 Claims, 3 Drawing Sheets

T.E.M. ANALYSIS X 7100

SS 505Y extruded c.6583

U.S. PATENT DOCUMENTS

| | | | |
|---|---|---|---|
| 5,821,302 A * | 10/1998 | Rosenau et al. | 525/80 |
| 5,936,036 A | 8/1999 | Kihara et al. | |
| 5,942,575 A * | 8/1999 | Monti et al. | 525/52 |
| 5,959,033 A * | 9/1999 | Demirors et al. | 525/86 |
| 5,985,997 A * | 11/1999 | Bowen et al. | 525/71 |
| 6,031,050 A | 2/2000 | Nozawa et al. | |
| 6,221,471 B1 * | 4/2001 | Salmang et al. | 428/220 |
| 6,545,090 B1 * | 4/2003 | Demirors et al. | 525/70 |

FOREIGN PATENT DOCUMENTS

| | | | |
|---|---|---|---|
| EP | 0 620 236 | | 10/1994 |
| IT | M 2003 A 001420 | * | 9/2004 |
| JP | 63 112646 | | 5/1988 |
| JP | 03 263415 | | 11/1991 |
| JP | 05 032848 | | 2/1993 |
| JP | 5 170991 | | 7/1993 |
| WO | 99/09081 | | 2/1999 |
| WO | WO2004/005397 | * | 1/2004 |

OTHER PUBLICATIONS

Burke "Solubility Parameters: Theory and Application" (pp. 1-6, 1984).*

* cited by examiner

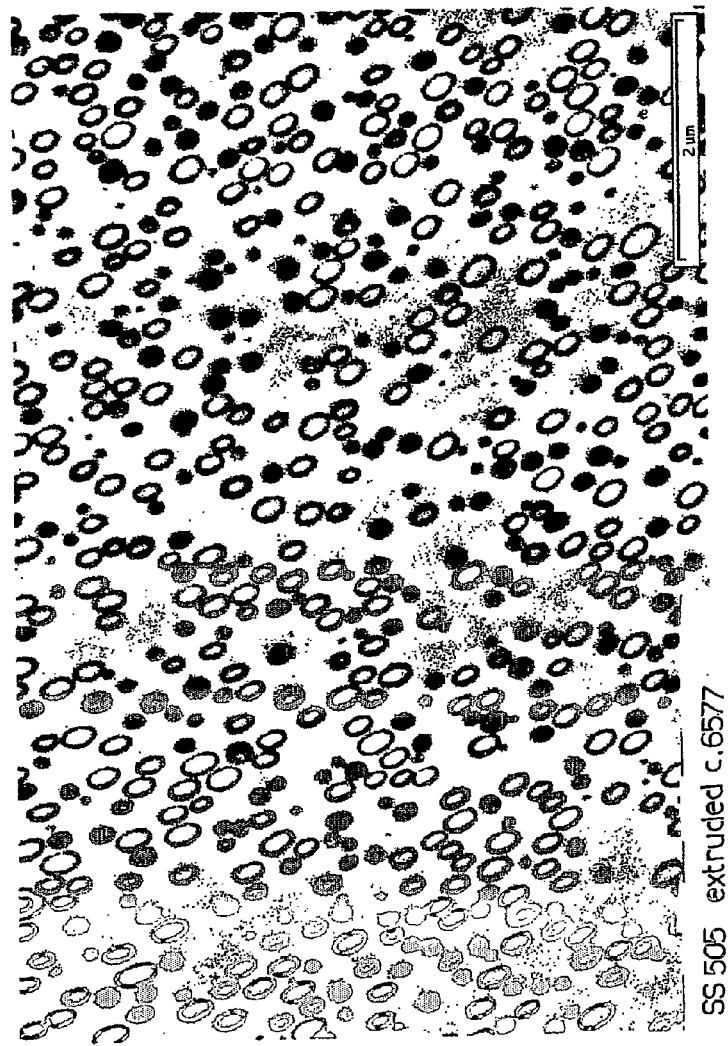

FIG.2 : EXAMPLE2 – T.E.M. ANALYSIS X 7100

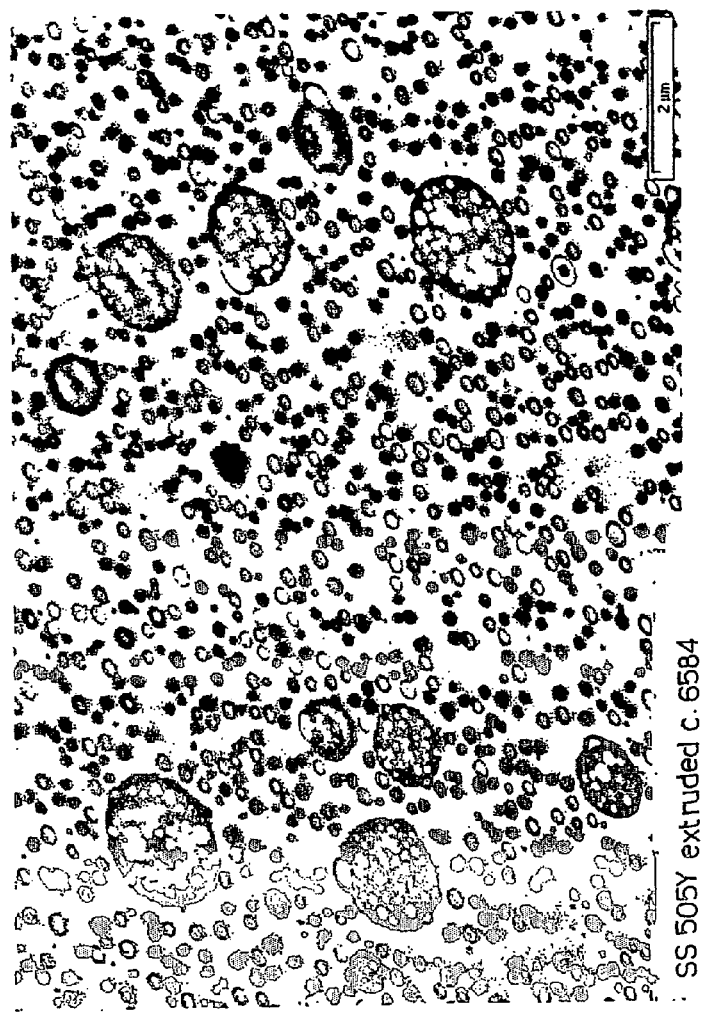

RUBBER-REINFORCED VINYL AROMATIC POLYMERS

The present invention relates to rubber-reinforced vinyl aromatic polymers.

More specifically, the present invention relates to compositions comprising a rigid matrix consisting of vinyl aromatic polymers or copolymers and a rubbery phase dispersed inside the matrix in the form of particles with a strictly bimodal distribution or morphology. The term "strictly bimodal distribution or morphology" as used in the present description and claims, indicates a series of rubber particles, randomly dispersed inside a rigid polymeric matrix, in which said particles have a bimodal morphology exclusively represented by a first class of particles (prevalent modal class) with a capsule or "core-shell" structure, having an average volume dimension ranging from 0.15 to 0.25 µm and a second class of particles (subvalent modal class) with a so-called "salami" structure, having an average volume dimension ranging from 1 to 5 µm and the complete absence of particles with an intermediate structure or dimension between said two classes.

It is well known that the physico-chemical characteristics and mechanical properties of vinyl aromatic polymers reinforced with rubber, in particular of high impact polystyrene (HIPS), depend on several factors, among which the dimensions of the rubbery particles grafted on the polymeric matrix and cross-linked.

It is also known that certain properties, such as the impact resistance and gloss, in particular in HIPS, are influenced, in an opposite manner, by the average dimension and distribution of the diameters of the rubbery particles, for a certain rubber concentration. In particular, the "large" particles increase the impact resistance of the material to the detriment of the gloss, whereas the "small" particles reduce the toughness but make the material extremely glossy.

Methods have been proposed in literature for obtaining rubber-reinforced vinyl aromatic polymers, for example rubber-reinforced polystyrenes, having a good gloss combined, at the same time, with a good impact resistance. One of these methods, for example, envisages the addition to the polymeric matrix of a limited number of "large" particles to a majority of "small" rubbery particles already present. The products obtained are generically defined as high impact vinyl aromatic polymers with a bimodal particle size distribution.

In the case of HIPS, this combination leads to a product with a synergy in the impact resistance combined with an excellent gloss.

The U.S. Pat. No. 4,153,645, for example, describes a HIPS with an enhanced property balance obtained by mechanically mixing (melt-blending) 50-85% by weight of a high impact polystyrene containing small rubbery particles (with an average diameter of about 0.2-0.9 µm) with 15-50% by weight of a high impact polystyrene containing larger rubbery particles (average diameter of about 2-5 µm). According to this patent, the final product obtained by mixing the two HIPS, has impact and flexural resistance values higher than those expected by applying the blend rule, without any decrease in the other physical properties.

Using the same type of process (melt-blending), U.S. Pat. No. 4,493,922 describes a HIPS with a bimodal morphology consisting of 60-95% by weight of "capsule" particles having a diameter of between 0.2 and 0.6 µm and 40-5% by weight of particles with a "cell" and/or "coil" morphology, with a diameter ranging from 2 to 8 µm.

The patents U.S. Pat. No. 4,221,883; U.S. Pat. No. 4,334,039; EP 96,447; U.S. Pat. No. 4,254,236; EP 15,752 and international patent applications WO98/52985 and WO99/09080 describe the so-called "split-feed polymerization" process for producing HIPS with a bi-modal morphology which allows an improvement in the gloss/impact balance. According to this process, the prevalent modal class of small particles is produced in two thirds of a pre-polymerization reactor, by feeding a dissolution in styrene of a low viscosity polybutadiene rubber or a block copolymer having a suitable composition. A second styrene dissolution of a high viscosity polybutadiene rubber is feed in the remaining third of the reactor. The high viscosity polybutadiene, when in contact with the previously formed pre-polymer, undergoes a rapid phase inversion, forming large particles, poorly grafted and which cannot be easily modulated as far as the dimension is concerned.

U.S. Pat. No. 5,240,993 describes a method ("parallel polymerization") for the preparation of impact resistance vinyl aromatic polymers, characterized by a bimodal distribution of the rubbery phase, according to a continuous mass process, using two plug flow reactors situated in parallel. A first pre-polymer containing a rubbery phase with small particles is prepared in one of the two reactors, whereas a second pre-polymer, containing a rubbery phase with large particles, is prepared in the other reactor. The polymeric streams are mixed at the outlet of the two reactors and the polymerization is completed in a third reactor, again of the plug flow type, called finishing reactor.

WO97/39040 describes a simplified version of this process, according to which, large particles are produced in the first half of a pre-polymerization reactor by feeding a suitable styrene solution of a high viscosity rubber, under such conditions as to guarantee a good grafting efficiency and an accurate dimensional control. The large-particle pre-polymer is mixed in the second half of the same reactor, in suitable proportions, with a second pre-polymer having small particles, previously produced in a reactor placed in series with the first.

One of the draw-backs of the above processes is that they require:
1. In the case of "melt blending", the use of a compounding step with a consequent increase in the production costs, or the preparation of HIPS components which cannot be easily sold as such.
2. In the case of "parallel polymerization" or "split-feed polymerization", the development and construction of industrial plants having a much more complex configuration (pre-polymerization reactors in parallel, delayed feedings of rubber dissolutions, reactors with partitioning septa) and equipped with much more sophisticated control systems with respect to the standard plants with polymerization reactors in series, used for producing conventional HIPS.

In addition to systems for the preparation of HIPS with a bimodal distribution of the reinforcing rubber particles, through the mixing of pre-formed products, alternative "chemical" methods have been proposed, which allow these particular morphologies to be obtained by operating on the formulations of the reaction feeds and using the same production configurations adopted for the traditional HIPS.

European patent 418,042, for example, describes a method for producing rubber-reinforced vinyl aromatic polymers, in which the particles have a "generally bimodal" distribution or a broader distribution including, in addition to the small (0.1-0.8 µm) prevalent modal class and the large (2-6 µm) subvalent modal class, also a third particle class having an intermediate dimension (0.8-2.0 µm). This distribution is obtained with a medium cis polybutadiene characterized by a bimodal distribution of the molecular weights and sold under the name of ASAPRENE 760 A.

European patent 731,016, similarly, describes the production of HIPS with a bimodal morphology using, in a conventional configuration of reactors, an elastomeric phase (dissolved in styrene) consisting of a medium cis and low viscosity polybutadiene and a high cis and high viscosity polybutadiene.

European patent 726,280 describes the production of HIPS with a bimodal morphology by introducing suitable concentrations of stable nitroxyl radicals during the HIPS polymerization step, with a conventional reactor configuration and with a high cis polybutadiene rubber.

International patent application WO03/033559, similarly, describes HIPS with a pseudo-bimodal morphology which can be obtained by introducing suitable concentrations of functionalized nano-composite materials into the HIPS polymerization with a conventional reactor configuration. The function of the nano-composite material is to transform part of the large rubbery particles into small rubbery particles.

The methods proposed in all these patents, however, have at least the drawback of not providing a "strictly bimodal" morphology of the rubber particles but only "generally bimodal" or simply "broadened".

Finally, European patent 620,236 proposes a method for obtaining HIPS with a "strictly bimodal" morphology. According to this method, a small amount of HIPS with large particles is dissolved in styrene together with the polybutadiene rubber or styrene-butadiene block copolymer necessary for producing the prevalent modal class of small particles. The solution obtained is polymerized with a conventional plant configuration. During the whole polymerization the cross-linked rubbery particles of the preformed HIPS do not undergo retro-inversion but keep their structure and dimension, whereas the polybutadiene rubber or styrene-butadiene copolymer form small particles with a corresponding structure and dimensions.

The basic limit of the technical solution proposed in this patent is represented by the highest percentage of preformed HIPS which can be dissolved in styrene together with the rubber (lower than 5%).

The Applicant has now found new rubber-reinforced vinyl aromatic polymers, having a strictly bimodal distribution of the rubbery particles, which do not have the typical drawbacks of the products of the known art, which can be obtained with standard production configurations and which have excellent physico-mechanical properties, mainly in terms of gloss and impact resistance.

An object of the present invention therefore relates to rubber-reinforced vinyl aromatic (co)polymers, having a strictly bimodal morphology, which consist of from 55 to 90% by weight of rigid polymeric matrix and from 10 to 45% by weight of a rubbery phase dispersed inside said rigid polymeric matrix in the form of grafted and occluded particles and wherein said rubber particles consist of from 60 to 99% by weight, preferably 70-95%, of particles with a capsule or "core-shell" morphology and from 1 to 40% by weight, preferably 5-30%, of particles with a "salami" morphology, said percentages being measured on the basis of the weight of the rubber particles only.

The term "vinyl aromatic (co)polymer", as used in the present description and claims, essentially refers to a product obtained from the polymerization of at least one monomer having the following general formula:

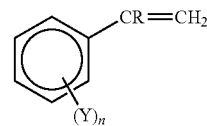

(I)

wherein R is a hydrogen or a methyl group, n is zero or an integer ranging from 1 and 5 and Y is a halogen such as chlorine or bromine, or an alkyl or alkoxyl radical having from 1 to 4 carbon atoms.

Examples of vinyl aromatic monomers having the above general formula are: styrene, α-methyl styrene, methyl styrene, ethyl styrene, butyl styrene, dimethyl styrene, mono-, di-, tri-, tetra- and penta-chloro styrene, bromo styrene, methoxy styrene, acetoxy styrene, etc. Styrene and α-methyl styrene are preferred vinyl aromatic monomers.

The vinyl aromatic monomers having general formula (I) can be used alone or blended with other monomers which can co-polymerize. The amount of copolymerizable monomer can be up to 40% by weight, generally from 15 to 35%, with respect to the total mixture of monomers. Examples of said monomers are (meth)acrylic acid, $C_1$-$C_4$ alkyl esters of (meth)acrylic acid, such as methyl acrylate, methyl methacrylate, ethyl acrylate, ethyl methacrylate, isopropyl acrylate, butyl acrylate, amides and nitrites of (meth)acrylic acid such as acrylamide, methacrylamide, acrylonitrile, methacrylonitrile, butadiene, ethylene, divinyl benzene, maleic anhydride, etc. Preferred monomers which can co-polymerize are acrylonitrile and methyl methacrylate.

According to the present invention, the core-shell particles have an average diameter of between 0.10 and 0.30 μm, preferably between 0.15 and 0.25 μm, whereas the particles with a "salami" structure have an average diameter of between 1 and 5 μm, preferably between 2 and 4 μm. The diameter ($D_v$) of the particles was measured by means of the following general formula:

$$D_v = \Sigma N_i(D_i)^4 / \Sigma N_i(D_i)^3$$

wherein $N_i$ and $D_i$ represent the number $N_i$ of particles having the diameter $D_i$.

BRIEF DESCRIPTION OF THE DRAWINGS

FIG. 1 is a transmission electronic microscope (T.E.M.) analysis of the polymer of Example 1 (Reference) which shows a rubbery phase with "capsule" or "core-shell" particles of 0.2 μm.

FIG. 2 is a transmission electronic microscope (T.E.M.) analysis of the polymer of Example 2 which shows a rubbery phase with a "strictly bimodal" distribution including "capsule" or "core-shell" particles of 0.2 μm and "salami" particles of 2.0 μm.

FIG. 3 is a tramsmission electronic microscope (T.E.M.) analysis of the polymer of Example 3 which shows a rubbery phase with a "strictly bimodal" distribution including "capsule" or "core-shell" particles of 0.2 μm and "salami" particles of 2.2 μm.

Elastomeric products capable of supplying a rubbery phase dispersed in the rigid polymeric matrix in the form of grafted and occluded particles with a capsule or "core-shell" morphology, are selected from homopolymers and copolymers of 1,3-alkadienes containing 40-100% by weight of 1,3-alkadiene monomer, for example 1,3-butadiene, and 0-60% by weight of one or more mono-ethylenically unsaturated monomers selected from styrene, acrylonitrile, α-methyl styrene, methyl methacrylate, ethyl acrylate.

Examples of 1,3-alkadienes copolymers are styrene-butadiene block copolymers, such as linear di-block rubbers of the S-B type, wherein S represents a polystyrene block having an average molecular weight Mw between 5,000 and 80,000, whereas B represents a polybutadiene block with an average molecular weight Mw between 2,000 and 250,000. In these rubbers the amount of S block ranges from 10 to 50% by weight with respect to the total S-B rubber. The preferred product is a styrene-butadiene block copolymer having a styrene content equal to 40% by weight and viscosity in solution, measured at 23° C. in a solution of 5% styrene by weight, ranging from 35 to 50 cPs.

Elastomeric products capable of providing a rubbery phase dispersed in the rigid polymeric matrix in the form of grafted and occluded particles with a "salami" morphology, are selected from homopolymers and copolymers of olefins or 1,3 alkadienes incompatible with the elastomeric products which produce the capsule rubbery phase. The criterion for choosing said incompatible elastomers is that the difference between the solubility parameter ($\delta$), according to Hildebrand, of the elastomer which produces the "capsule" rubbery particles and the solubility parameter, again according to Hildebrand, of the elastomer which produces the "salami" rubbery particles, is higher than or equal to 0.5. Information on the solubility parameter can be found in "CRC Handbook of Polymer-Liquid Interaction Parameters and Solubility Parameters"—Allan F. M. Barton—CRC Press Boca Raton, Boston.

Consequently, if a 40/60 styrene-butadiene copolymer ($\delta=8.7$) is used for obtaining "capsule" particles, elastomers suitable for obtaining "salami" rubbery particles are polyisobutene ($\delta=7.9$), polyisoprene-co-isobutene or butyl rubber ($\delta=7.8$), polyisoprene ($\delta=8.2$), EPDM rubber ($\delta=8.05$). The preferred product is polyisoprene with a solution viscosity, measured as per above, of between 100 and 1000 cPs.

Conventional additives, generally used with traditional vinyl aromatic (co)polymers, such as pigments, stabilizing agents, plasticizers, flame retardants, antistatic agents, mold releasing agents, etc. can be added to the rubber-reinforced (co)polymers, object of the present invention.

A further object of the present invention relates to a continuous-mass process for the preparation of rubber-reinforced vinyl aromatic (co)polymers, with a strictly bimodal morphology, consisting of from 55 to 90% by weight of rigid polymeric matrix and from 10 to 45% by weight of a dispersed rubbery phase inside said rigid polymeric matrix, in the form of grafted and occluded particles, wherein said rubber particles consist of from 60 to 99% by weight of particles with a "capsule" or "core-shell" morphology and from 1 to 40% by weight, preferably 5-30%, of particles with a "salami" morphology, said process comprising:

i) dissolving from 3 to 20% by weight of a rubber selected from homopolymers and copolymers of 1,3-alkadienes containing 40-100% by weight of 1,3-alkadiene monomer and 0-60% by weight of one or more mono-ethylenically unsaturated monomers, having a solubility parameter ($\delta_1$) and from 0.05 to 8.0% by weight of a rubber selected from homopolymers and copolymers of olefins or 1,3-alkadienes incompatible with the previous rubber, having a solubility parameter ($\delta_2$) which is such that $\delta_1-\delta_2 \geq 0.5$, in a liquid essentially consisting of at least one vinyl aromatic monomer;

ii) polymerizing the resulting solution at a temperature ranging from 50 to 250° C. optionally in the presence of polymerization initiators and/or chain transfer agents;

iii) recovering the vinyl aromatic (co)polymer thus obtained.

The process object of the present invention can be carried out in continuous using the equipment normally used for preparing traditional reinforced vinyl aromatic (co)polymers, such as PFR plug flow reactors or CFSTR reactors whose operating conditions are described, for example, in U.S. Pat. Nos. 2,727,884 or 3,903,202.

The rubbers are dissolved in the monomers possibly in the presence of an inert solvent in quantities ranging from 5 to 20% by weight with respect to the total. Examples of inert solvents which can be used in the process object of the present invention include aromatic hydrocarbons which are liquid at the polymerization temperature, such as, for example, toluene, ethyl benzene, xylenes, or mixtures thereof. The dissolution of the rubbers in the mixture of monomers and possible solvent is carried out in a mixer maintained at a temperature not higher than 100° C.

The reactors are maintained, during the polymerization reaction, at a pressure higher than the pressure at which the components fed evaporate. The pressure normally ranges from 0.5 to 5 bar whereas the temperature preferably ranges from 70 to 150° C. When PFR reactors are used, the temperature is distributed in order to have two or more zones heated at different temperatures.

The initiators used are of the conventional type adopted for the polymerization of styrene, such as, for example, organic peroxy radicalic initiators. Examples of said initiators are: dibenzoyl peroxide, tert-butyl peroctoate, tert-butyl perbenzoate, di-tert-butyl peroxide, 1,1'-di-tert-butyl peroxy-3,3,5-trimethyl cyclohexane, 1,1'-di-tert-butyl peroxy cyclohexane, etc. These initiators are added in quantities ranging from 0.005 to 0.5% by weight with respect to the monomer.

The chain transfer agents are also those conventionally used in styrene polymerization and are selected from mercaptans such as, for example, n-dodecyl mercaptan, t-dodecyl mercaptan (TDM), lauryl mercaptan, stearyl mercaptan, benzyl mercaptan cyclohexyl mercaptan, etc. These chain transfer agents are added in quantities ranging from 0.005 to 0.5% by weight with respect to the monomer.

Once the polymerization is finished, after reaching the desired conversion degree (65-95%), the possible solvents present and the non-reacted monomers are removed under vacuum and at a high temperature (200-260° C.), whereas the resulting polymer is extruded, cooled and cut into pellets of the desired dimensions. The gaseous products which have been removed are condensed and possibly recycled.

As an alternative, the process, object of the present invention can be carried out in a completely equivalent manner, by means of a batch process in mass-suspension, using stirred autoclaves of the batch-reactor type.

A second further object of the present invention therefore relates to a mass-suspension process for the preparation of rubber-reinforced vinyl aromatic (co)polymers having strictly bimodal morphology, consisting of from 55 to 90% by weight of a rigid polymeric matrix and from 10 to 45% by weight of a rubbery phase dispersed inside said rigid polymeric matrix in the form of grafted and occluded particles, and wherein said rubber particles consist of 60 to 99% by weight of particles with a capsule or "core-shell" morphology and from 1 to 40% by weight, preferably 5-30%, of particles with a "salami" morphology, said process including:

i) dissolving from 3 to 20% by weight of a rubber selected from homopolymers and copolymers of 1,3-alkadienes containing 40-100% by weight of 1,3-alkadiene monomer and 0-60% by weight of one or more mono-ethylenically unsaturated monomers, having a solubility parameter ($\delta_1$), and from 0.05 to 8.0% by weight of a rubber selected from homopolymers and copolymers of olefins or 1,3-alkadienes incompatible with the previous rubber, having a solubility parameter ($\delta_2$) which is such that $\delta_1 - \delta_2 \geq 0.5$, in a liquid essentially consisting of at least one vinyl aromatic monomer;

ii) pre-polymerizing the resulting solution at a temperature ranging from 50 to 250° C. possibly in the presence of polymerization initiators and/or chain transfers, until phase inversion takes place;

iii) completing the polymerization in aqueous phase in the presence of suspending agents.

In this type of process, the rubbers selected from those previously indicated, are dissolved in the monomers possibly in the presence of an inert solvent, in quantities ranging from 5 to 20% by weight with respect to the total. Examples of inert solvents which can be used in the process object of the present invention are aromatic hydrocarbons which are liquid at the polymerization temperature, such as, for example, toluene, ethyl benzene, xylenes, or mixtures thereof. The dissolution of the rubbers in the monomer mixture and possible solvent, is carried out in the same pre-polymerization autoclave (batch reactor) maintained at a temperature not higher than 100° C.

During the pre-polymerization reaction, the reactor is maintained at a pressure higher than that at which the components fed evaporate. Normally the pressure ranges from 0.5 to 5 bar, whereas the temperature is preferably between 70 and 150° C., with a stirring rate of between 10 and 100 rpm. The initiators used are those conventionally adopted in the polymerization styrene of styrene such as, for example, the organic peroxide radicalic initiators previously cited. Examples of these initiators are: dibenzoyl peroxide, tert-butyl peroctoate, tert-butyl perbenzoate, di-tert-butyl peroxide, 1,1'-di-tert-butyl peroxy-3,3,5-trimethyl cyclohexane, 1,1'-di-tert-butyl-peroxy cyclohexane, etc. These initiators are added in amounts ranging from 0.005 to 0.5% by weight with respect to the monomer.

The chain transfer agents are also those conventionally used in the polymerization of styrene, cited above. Examples of chain transfer agents are selected from mercaptans such as, for example, n-dodecyl mercaptan, t-dodecyl mercaptan (TDM), lauryl mercaptan, stearyl mercaptan, benzyl mercaptan, cyclohexyl mercaptan, etc. These chain transfer agents are added in quantities ranging from 0.005 to 0.5% by weight with respect to the monomer.

Once the pre-polymerization with phase inversion has been carried out, the polymer is transferred to a second autoclave of the batch type, it is suspended in an aqueous phase (water/organic phase weight ratio of between 1/1 and 3/2), containing one or more suspending agents, for example sodium chloride, sodium naphthalene sulfonate and/or poly-[(acrylic acid)-co-(2-ethyl-hexyl-acrylate)], possible peroxy initiators or mercaptan chain transfer agents are added and the polymerization is completed, by heating to temperatures of between 100 and 170° C., until a full conversion of monomers to polymer is reached. At the end, the polymer is recovered with traditional methods.

Some illustrative examples are provided hereunder for a better understanding of the present invention but in no way limit the scope of the invention itself.

EXAMPLE 1

Reference 4.2 kg of BUNA BL 6533 TC (BAYER) styrene-butadiene 40/60 copolymer, 0.90 kg of PRIMOL 352 (ESSO) vaseline oil and 30 g of ANOX PP 18 antioxidant in 24.9 kg of styrene monomer are dissolved in a 50 l batch autoclave with an anchor stirrer, stirring for 5 hours at 85° C. 24 g of TDM chain transfer agent are then added and the pre-polymerization is carried out with grafting and phase inversion, heating and stirring the solution thus obtained for 5 hours and 30 minutes at 120° C. Two 3 g doses of TDM are added during the pre-polymerization, 3 hours and 5 hours after the beginning of the heating to 120° C. In the end, the pre-polymer is transferred to a second 100 l autoclave a with helix stirrer and is suspended in an aqueous phase (water/organic matter ratio=1/1) containing NaCl (0.11% by weight), sodium naphthalene sulfonate (0.31% by weight) and poly-[(acrylic acid)-co-(2-ethyl-hexyl-acrylate)] (0.13% by weight). 30 g of di-tert-butyl peroxide are added and the polymerization is carried out until the total conversion of the monomer and cross-linking of the rubbery phase, by heating under stirring for 1 hour at 120° C., 2 hours at 140° C. and 3 hours at 155° C. In the end the polymer in the form of beads is washed, dried and pelletized in an extruder. Analysis of the polymer with a transmission electronic microscope (TEM) shows a rubbery phase with "capsule" or "core-shell" particles of 0.2 μm (FIG. 1). The physico-mechanical properties on injection test samples of the polymer obtained are shown in table 1.

EXAMPLE 2

Example 1 is repeated with the only difference that instead of the BUNA BL 6533 TC copolymer alone, a blend is used consisting of 3.6 kg of BUNA BL 6533 TC copolymer and of 0.6 kg of polyisoprene IR 2200 L (NIPPON ZEON).

Analysis of the polymer using a transmission electronic microscope (TEM) shows a rubbery phase with a "strictly bimodal" distribution including "capsule" or "core-shell" particles of 0.20 μm and "salami" particles of 2.0 μm (FIG. 2). The physico-mechanical properties on injection test samples of the polymer obtained are shown in table 1.

EXAMPLE 3

Example 2 is repeated, with the only difference that a blend consisting of 3.0 kg of BUNA BL 6533 TC copolymer and of 1.2 kg of polyisoprene IR 2200 L (NIPPON ZEON) is used.

Analysis of the polymer using a transmission electronic microscope (TEM) shows a rubbery phase with a "strictly bimodal" distribution including "capsule" or "core-shell" particles of 0.20 μm and "salami" particles of 2.2 μm (FIG. 3). The physico-mechanical properties on injection test samples of the polymer obtained are shown in table 1.

TABLE 1

| | UNIT | EX. 1 | EX. 2 | EX. 3 |
|---|---|---|---|---|
| PROPERTIES | | | | |
| MFI (200° C. - 5 KG) ISO 1133 | g/10' | 7.0 | 9.9 | 9.9 |
| VICAT 5 KG ISO 306 | ° C. | 88.2 | 87.6 | 87.8 |
| IZOD ASTM D 256 ½ * ½ int | J/m | 53 | 65 | 92 |
| IZOD ASTM D 256 ½ * ⅛ int | J/m | 60 | 87 | 121 |
| IZOD ISO 180/1A int. | KJ/m² | 4.8 | 4.9 | 8.2 |
| CHARPY ISO 179/1A int. | KJ/m² | 4.3 | 4.4 | 6.5 |
| GLOSS (20°) ASTM D 526 | % | 71 | 29 | 13 |
| GLOSS (60°) ASTM D 526 | % | 96 | 77 | 61 |
| TENSILE STRENGTH ISO 527 | | | | |
| $\sigma_S$ | MPa | 30.3 | 26.6 | 25.6 |
| $\sigma_R$ | MPa | 23.2 | 19.9 | 19.4 |
| $\epsilon_S$ | % | 20.6 | 21.1 | 28.4 |
| ELASTIC MODULUS | MPa | 1950 | 1850 | 1890 |

TABLE 1-continued

| | UNIT | EX. 1 | EX. 2 | EX. 3 |
|---|---|---|---|---|
| FLEXURAL STRENGTH ISO 178 | | | | |
| $\sigma_{MAX}$ | MPa | 48.2 | 42.5 | 39.0 |
| ELASTIC MODULUS | MPa | 2090 | 1990 | 1940 |
| BALL DROP ISO 6603/2 2 mm | J | 1.8 | 15.0 | 14.7 |
| BALL DROP ISO 6603/2 3 mm | J | 7.6 | 22.8 | 21.2 |

The invention claimed is:

1. A mass-continuous process for the preparation of a rubber-reinforced vinyl aromatic (co)polymer comprising:
   a. preparing a solution comprising:
      from 3 to 20% by weight of a rubber having a solubility parameter ($\delta_1$ MPa$^{1/2}$), selected from the group consisting of homopolymers and copolymers of 1,3-alkadienes containing 40-100% by weight of 1,3-alkadiene monomer and 0-60% by weight of one or more mono-ethylenically unsaturated monomers,
      from 0.05 to 8.0% by weight of a rubber having a solubility parameter ($\delta_2$ MPa$^{1/2}$) selected from the group consisting of homopolymers and copolymers of olefins or 1,3-alkadienes and
      at least one vinyl aromatic monomer;
   b. polymerizing the solution at a temperature ranging from 50 to 250° C. optionally in the presence of polymerization initiators and/or chain transfer agents to obtain the rubber-reinforced vinyl aromatic (co)polymer with a strictly bimodal morphology; and
   c. recovering the rubber-reinforced vinyl aromatic (co)polymer thus obtained;
   wherein
   the rubber of solubility parameter $\delta_1$ and the rubber of solubility parameter $\delta_2$ are incompatible,
   $\delta_1 - \delta_2 \geq 0.5$, and
   the recovered rubber-reinforced vinyl aromatic (co)polymer consists of:
      from 55 to 90% by weight of rigid polymeric matrix and
      from 10 to 45% by weight of grafted and occluded particles having a strictly bimodal morphology, consisting of:
         from 60 to 99% by weight of particles with a capsule or "core-shell" morphology and
         from 1 to 40% by weight of particles with a "salami" morphology.

2. The mass-continuous process for the preparation of a rubber-reinforced vinyl aromatic (co)polymer according to claim 1, wherein
   the particles with a "core-shell" morphology have an average diameter ranging from 0.10 to 0.30 µm, and
   the particles with a "salami" morphology have an average diameter ranging from 1 to 5 µm.

3. The mass-continuous process for the preparation of a rubber-reinforced vinyl aromatic (co)polymer according to claim 1, wherein
   the rubber having a solubility parameter ($\delta_1$) is a linear diblock rubber of an S-B type,
      wherein S is a polystyrene block having an average molecular weight Mw between 5,000 and 80,000, and B is a poly-butadiene block with an average molecular weight Mw between 2,000 and 250,000.

4. The mass-continuous process for the preparation of a rubber-reinforced vinyl aromatic (co)polymer according to claim 3, wherein an amount of the polystyrene S block is from 10 to 50% by weight with respect to the total weight of the S-B rubber.

5. The mass-continuous process for the preparation of a rubber-reinforced vinyl aromatic (co)polymer according to claim 4, wherein
   the polystyrene S block content is 40% by weight and
   a viscosity of the S-B rubber in solution, measured at 23° C. in a 5% by weight styrene solution, is from 35 to 50 cPs.

6. The mass-continuous process for the preparation of a rubber-reinforced vinyl aromatic (co)polymer according to claim 1, wherein
   the rubber having a solubility parameter ($\delta_2$) is polyisoprene, and
   a viscosity of the polyisoprene in solution, measured at 23° C. in a 5% by weight styrene solution, is from 100 to 1000 cPs.

7. The mass-continuous process for the preparation of a rubber-reinforced vinyl aromatic (co)polymer according to claim 1, wherein
   wherein the vinyl aromatic monomer is represented by formula (I):

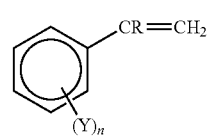

wherein R is a hydrogen or a methyl group, n is zero or an integer ranging from 1 to 5 and Y is a halogen, or an alkyl or alkoxyl radical having from 1 to 4 carbon atoms.

8. The mass-continuous process for the preparation of a rubber-reinforced vinyl aromatic (co)polymer according to claim 1, wherein the solution prepared in the at least one vinyl aromatic monomer further comprises: an inert solvent and
   a content of the at least one vinyl aromatic monomer and inert solvent is 5 to 20% by weight with respect to a total weight.

9. The mass-continuous process according to claim 8, wherein the solution is prepared in a mixer maintained at a temperature not higher than 100° C.

10. The mass-continuous process for the preparation of a rubber-reinforced vinyl aromatic (co)polymer according to claim 1, wherein the polymerization comprises at least one polymerization initiator and a content of the at least one polymerization initiator is from 0.005 to 0.5% by weight with respect to a weight of the at least one vinyl aromatic monomer.

11. The mass-continuous process for the preparation of a rubber-reinforced vinyl aromatic (co)polymer according to claim 1, wherein the polymerization comprises at least one chain transfer agent an a content of the at least one chain transfer agent is from 0.005 to 0.5% by weight with respect to a weight of the at least one vinyl aromatic monomer.

12. A mass-suspension process for the preparation of a rubber-reinforced vinyl aromatic (co)polymer, comprising:
   i) preparing a solution comprising:
      from 3 to 20% by weight of a rubber having a solubility parameter ($\delta_1$ MPa$^{1/2}$), selected from the group consisting of homopolymers and copolymers of 1,3-alkadienes containing 40-100% by weight of 1,3-alkadiene monomer and from 0-60% by weight of one or more mono-ethylenically unsaturated monomers, from 0.05 to 8.0% by weight of a rubber having a solubility parameter ($\delta_2$ MPa$^{1/2}$) selected from the group consisting of homopolymers and copolymers of olefins or 1,3-alkadienes and
at least one vinyl aromatic monomer;
ii) pre-polymerizing the solution at a temperature ranging from 50 to 250° C. optionally in the presence of polymerization initiators and/or chain transfer agents, until phase inversion takes place;
iii) after phase inversion, suspending the phase-inverted prepolymer in an aqueous phase with suspending agents; and
iv) completing polymerization in the aqueous phase in the presence of suspending agents to obtain the rubber-reinforced vinyl aromatic (co)polymer with a strictly bimodal morphology;
wherein
$\delta_1 - \delta_2 \geq 0.5$, and
the recovered rubber-reinforced vinyl aromatic (co)polymer consists of:
from 55 to 90% by weight of rigid polymeric matrix and
from 10 to 45% by weight of grafted and occluded particles having a strictly bimodal morphology, consisting of:
from 60 to 99% by weight of particles with a capsule or "core-shell" morphology and
from 1 to 40% by weight of particles with a "salami" morphology.

13. The process for preparing a rubber-reinforced vinyl aromatic (co)polymer according to claim 12, wherein
the particles with a "core-shell" morphology have an average diameter ranging from 0.10 to 0.30 μm, and
the particles with a "salami" morphology have an average diameter ranging from 1 to 5 μm.

14. The process for preparing a rubber-reinforced vinyl aromatic (co)polymer according to claim 12, wherein
the rubber having a solubility parameter ($\delta_1$) is a linear diblock rubber of an S-B type,
wherein S is a polystyrene block having an average molecular weight Mw between 5,000 and 80,000, and B is a poly-butadiene block with an average molecular weight Mw between 2,000 and 250,000.

15. The process for preparing a rubber-reinforced vinyl aromatic (co)polymer according to claim 14, wherein an amount of the polystyrene S block is from 10 to 50% by weight with respect to the total weight of the S-B rubber.

16. The process for preparing a rubber-reinforced vinyl aromatic (co)polymer according to claim 15, wherein
the polystyrene S block content is 40% by weight and
a viscosity in solution, measured at 23° C. in a 5% by weight styrene solution, is from 35 to 50 cPs.

17. The process for preparing a rubber-reinforced vinyl aromatic (co)polymer according to claim 12, wherein
the rubber having a solubility parameter ($\delta_2$) is polyisoprene, and
a viscosity in solution, measured at 23° C. in a 5% by weight styrene solution, is from 100 to 1000 cPs.

18. The process for preparing a rubber-reinforced vinyl aromatic (co)polymer according to claim 12, wherein
wherein the vinyl aromatic monomer is represented by formula (I):

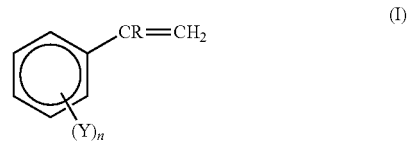

wherein R is a hydrogen or a methyl group, n is zero or an integer ranging from 1 to 5 and Y is a halogen, or an alkyl or alkoxyl radical having from 1 to 4 carbon atoms.

19. The process for preparing a rubber-reinforced vinyl aromatic (co)polymer according to claim 12, wherein the solution prepared in the at least one vinyl aromatic monomer further comprises: an inert solvent and
a content of the at least one vinyl aromatic monomer and inert solvent is 5 to 20% by weight with respect to a total weight.

20. The process according to claim 19, wherein the solution is prepared in a mixer maintained at a temperature not higher than 100° C.

21. The process according to claim 12, wherein during the pre-polymerization reaction in solution, the reactors are maintained at a pressure ranging from 0.5 to 5 bar and a temperature of between 70 and 150° C., whereas during the polymerization reaction in suspension the temperature ranges from 100 to 170° C.

* * * * *